(12) United States Patent
Kubota et al.

(10) Patent No.: US 7,414,926 B2
(45) Date of Patent: Aug. 19, 2008

(54) OPTICAL HEAD DEVICE THAT PREVENTS THE DISPLACEMENT OF THE OPTICAL AXIS CAUSED BY EXPANSION OR CONTRACTION DUE TO TEMPERATURE CHANGE

(75) Inventors: Hiroshi Kubota, Nagano (JP); Hiroshi Sakai, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 539 days.

(21) Appl. No.: 10/742,370

(22) Filed: Dec. 19, 2003

(65) Prior Publication Data
US 2004/0184366 A1 Sep. 23, 2004

(30) Foreign Application Priority Data
Dec. 24, 2002 (JP) ............................. 2002-372556

(51) Int. Cl.
*G11B 7/00* (2006.01)
(52) U.S. Cl. .................................... 369/44.11
(58) Field of Classification Search ............. None
See application file for complete search history.

(56) References Cited

U.S. PATENT DOCUMENTS 4,641,023 A * 2/1987 Ando et al. ............... 250/216
5,083,302 A * 1/1992 Tsuyuguchi et al. ...... 369/44.11
6,356,526 B1   3/2002 Ito

FOREIGN PATENT DOCUMENTS

JP    2000-266977    9/2000

* cited by examiner

*Primary Examiner*—Joseph Feild
*Assistant Examiner*—Joseph Haley
(74) *Attorney, Agent, or Firm*—Reed Smith LLP

(57) ABSTRACT

An optical head device including a photo detector and an optical system which converges a laser beam emitted by a laser light source onto an optical recording medium and also guides a returning beam from the optical recording medium to the photo detector. The optical head device further includes a base on which the laser light and the photo detector are mounted. An optical element is mounted on the base via an optical element holder which has the same linear expansion coefficient as that of the base and is fixed with adhesive directly to the base. The optical element is fixed on a surface which is perpendicular to a device optical axis of the element holder.

5 Claims, 3 Drawing Sheets

OPTICAL HEAD DEVICE THAT PREVENTS THE DISPLACEMENT OF THE OPTICAL AXIS CAUSED BY EXPANSION OR CONTRACTION DUE TO TEMPERATURE CHANGE

CROSS-REFERENCE TO RELATED APPLICATIONS

This application claims priority to Japanese patent application No. 2002-372556, filed Dec. 24, 2002, which is incorporated herein by reference.

TECHNICAL FIELD

The present invention relates to an optical head device which performs the recording on optical recording media.

RELATED ART

In an optical head device which performs the recording and the reproduction of CDs, CD-Rs, and DVDs, a laser beam emitted by a laser light source is converged by an optical system composed of a collimating lens, a raising mirror (a mirror for allowing a laser beam to rise vertically), and an objective lens to form a spot on the optical recording medium, and a returning beam from the optical recording medium is guided to a photo detector through the optical system composed of the objective lens, the raising mirror, the collimating lens, and a lens for focus error detection.

The optical elements included in the optical system are mounted on a base. On the base, the optical axes of the optical elements need to align with each other, and also the surfaces for fixing the optical elements need to be adjusted with respect to the optical axis.

For these reasons, a conventional base has a surface that is perpendicular to the optical axis, which serves as an element-mounting surface, and the optical elements are fixed on the element-mounting surface. With such a configuration, even when the base expands or contracts due to a change in temperature, the relative positional relationship among the optical elements does not change. Therefore, the elements are kept on the single optical axis.

However, such a configuration has the problem that, if the element-mounting surface formed on the base is inclined even a little with respect to the optical axis, the relative positional relationship among the optical elements will be changed when the base expands or contracts. This causes the optical axis to be displaced.

A method for mounting the optical elements on the base has been proposed wherein a plurality of positioning surfaces passing through the optical axis are formed on the base, an optical element holder having fixing surfaces which contact the positioning surfaces is prepared, and the optical elements are mounted on the base via the optical element holder. Such method is disclosed, for example, in Japanese Laid-open Patent Application H2000-266977 (see FIG. 3 and FIG. 4), which is incorporated herein by reference.

With this configuration, a plurality of positioning surfaces passing through the optical axis need to be formed on the base, which in turn complicates the shape of the optical element holder. This is not practical.

Considering the above problems, the objective of the present invention is to provide an optical head device having a simple configuration which can prevent the displacement of the optical axis caused by expansion or contraction due to temperature change in the base on which the optical elements are mounted.

SUMMARY OF THE INVENTION

To achieve the above objective, the present invention comprises a laser light source, a photo detector, an optical system which converges a laser beam emitted by the laser light source onto an optical recording medium and also guides a returning beam from the optical recording medium to the photo detector, and a base on which the laser light and the photo detector are mounted; wherein the optical system has an optical element which is mounted on the base via an optical element holder; the optical element holder is composed of a material having the same linear expansion coefficient as that of the base and is fixed with adhesive directly to the base; and the optical element is fixed on a surface which is perpendicular to a device optical axis of the element holder.

Since the optical element is mounted on the base via the optical element holder in the present invention, the position of the optical element can be adjusted by adjusting the position of the optical element holder. Also, the element holder is composed of a material having the same linear expansion coefficient as that of the base and also fixed with adhesive directly to the base. Also, the optical elements are fixed to a surface that is perpendicular to the device optical axis of the element holder. For these reasons, even when the temperature rises, the displacement of the optical axis may be only ⅓ (one third) of that produced when the optical element is mounted directly on the base.

In the present invention, it is preferred that the optical system further has a first optical element mounted directly on the base and a second optical element mounted on the base via the optical element holder, two positioning surfaces are formed on the mounting portion on the base for the second optical element such that the two surfaces are parallel to an optical axis passing through said second optical element and intersect with each other, and the optical element holder is equipped with two fixing surfaces which respectively contact the two positioning surfaces. With this configuration, the two fixing surfaces of the optical element holder respectively make contact with the two positioning surfaces of the base; therefore, the optical axis of the second optical element can be aligned with the optical axis of the laser beam simply by positioning the optical element holder on the base. Also, the position of the second optical element in the optical axis direction can be adjusted simply by moving the optical element holder in the optical axis direction. Further, while the second optical element is mounted on the base via the element holder, the two positioning surfaces are parallel to the optical axis of the second optical element, and the element holder has the same linear expansion coefficient as that of the base. For these reasons, even if the temperature of the optical element holder rises to cause its expansion, the relative position of the first optical element and the second optical element does not change, keeping the optical axes from displacement.

In the present invention it is preferred that the two positioning surfaces are orthogonal to each other. With this configuration, the two fixing surfaces may be formed at a right angle on the outer circumferential surface of the optical element holder.

In another aspect of the invention, the first optical element is the photo detector and the second optical element received in the holder is a focus-error detecting lens.

DETAILED DESCRIPTION OF THE INVENTION

Figure 1A:
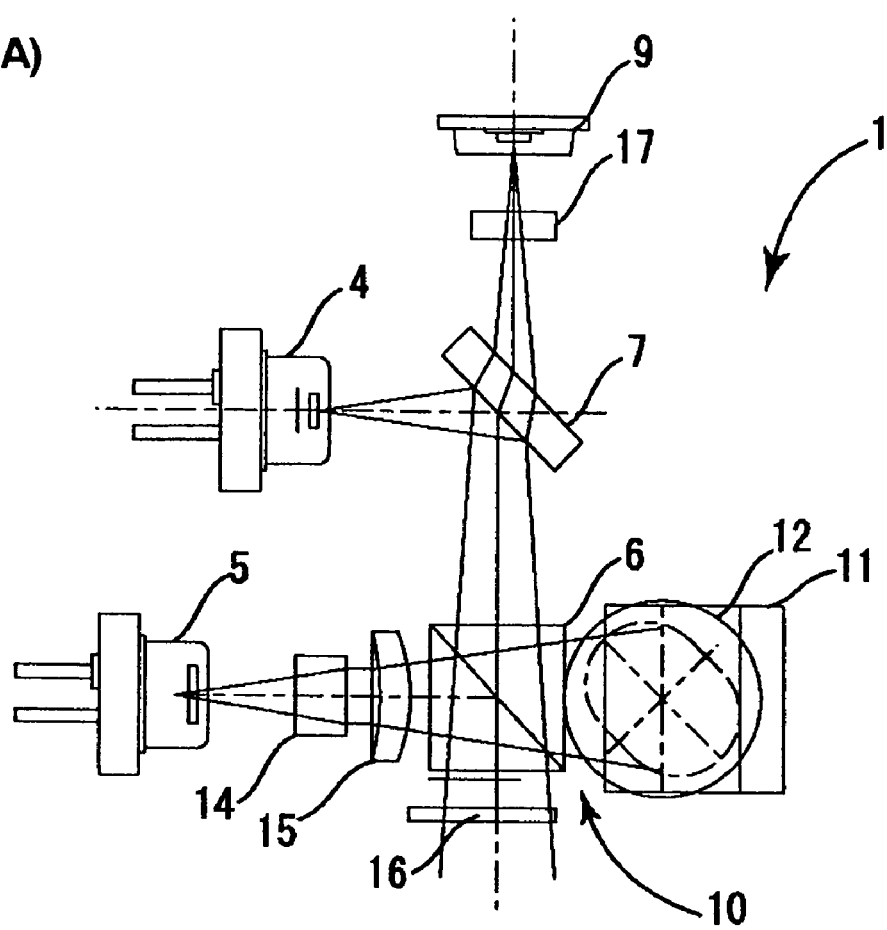
FIG. 1(A) is a diagram showing an optical system of an optical head device to which the present invention is applied.

An optical head device to which the present invention is applied is described hereinafter referring to the drawings.

Figure 1B:
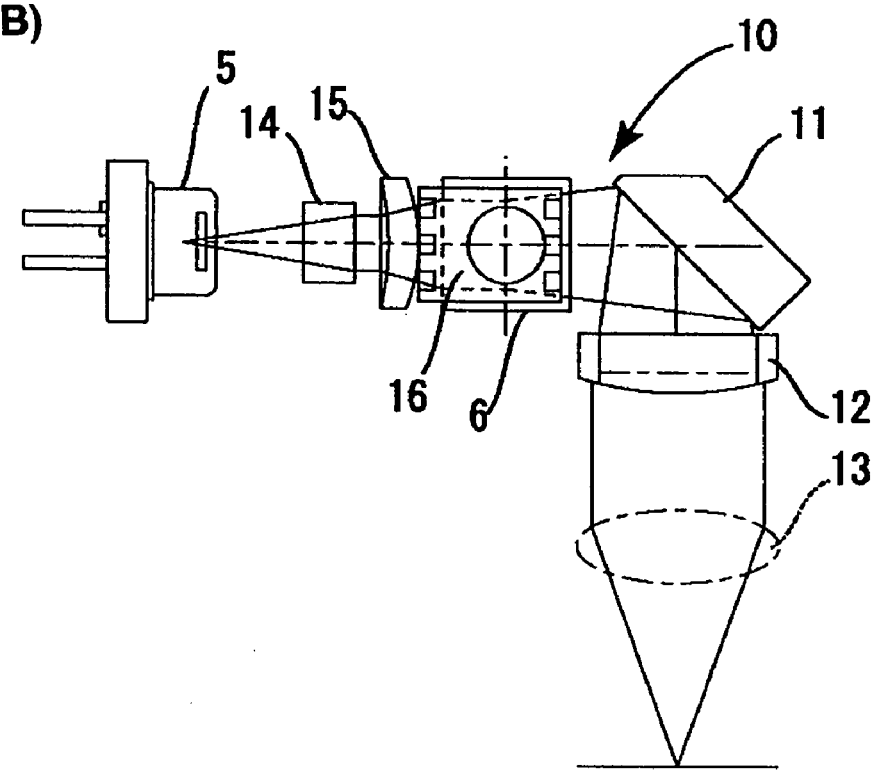
FIG. 1(B) is a diagram showing the optical system observed from the side of a front monitoring photo detector.

FIGS. 1(A) and (B) are respectively a diagram showing an optical system of an optical head device to which the present invention is applied, and a diagram of the optical systems observed from the side of a front monitor photo detector. Note that, since most of the optical elements can be seen well from the bottom of the base, the optical system of FIG. 1(A) is observed from the bottom surface. For this reason, an objective lens is positioned on the lower side in the figure in FIG. 1(B); however, since the optical head device is normally positioned lower than the optical recording media, the actual positioning of the optical system in the top-bottom direction is opposite from that shown in FIG. 1(B).

The optical head device 1 shown in FIGS. 1(A) and (B) performs the recording and reproduction of CDs, CD-Rs, and DVDs. The optical elements which are described herein are mounted on a base which will be described later. The base is attached to be movable along two parallel guide shafts (not illustrated) which are fixed on a device frame (not illustrated).

In the optical head device 1, the optical system has a first laser diode 4 (a first laser light source) for DVDs, which emits the first laser beam having a 650 nm wavelength or 635 nm wavelength (short wavelength), and a second laser diode 5 (a second laser light source) for CDs, which emits the second laser beam having a 760~800 nm wavelength (long wavelength).

In this embodiment, the optical system guides the first laser beam emitted by the first laser diode 4 and the second laser beam emitted by the second laser diode 5 onto a common optical path 10 toward an optical recording medium through a prism 6. On the common optical path 10, a raising mirror 11, a collimating lens 12, and an objective lens 13 are arranged in this order. Among those optical elements, the objective lens 13 is mounted in an objective lens holder (not illustrated) which is a lens driving device; when the lens driving device which moves along and rotates around a shaft is used, the objective lens is supported to be movable and rotatable with respect to the support shaft of the holder support member.

In the optical head device 1 of the present invention, in order to guide the first laser beam emitted by the first laser diode 4 and the second laser beam emitted by the second laser diode 5 to the prism 6, a half mirror 7, which is an optical element for splitting the returning beam, is placed on the optical path from the first laser diode to the optical recording medium so that the first laser beam is partially reflected toward the prism 6 and also the returning beam from the optical recording medium is partially transmitted toward the photo detector 9. A grating lens 14 and a relay lens 15 are placed on the optical path from the second laser diode 5 to the prism 6.

Between the half mirror 7 and the photo detector 9, a focus-error detecting lens 17 is placed as an astigmatism-causing element. The lens 17 produces astigmatism of the returning beam of the laser light to detect focus-errors.

Further, a front monitoring photo detector 16 is placed opposite from the prism 6 with respect to the half mirror 7.

In the optical head device 1 configured as above, the first laser beam emitted by the first laser diode 4 is partially reflected by the partial reflective surface of the half mirror 7, the optical axis of the beam is bent at a right angle to be incident on the prism 6. The first laser beam incident on the prism 6 is partially reflected by the partial reflective surface of the prism 6 to reach the common optical path 10, and then passes through the mirror 11 toward the collimating lens 12.

On the other hand, the second laser beam emitted by the second laser diode 5 passes through the grating 14 and the relay lens 15 and enters the prism 6. The second laser beam incident on the prism 6 is partially transmitted through the partial reflective surface of the prism 6 to reach the common optical path 10, and then passes through the raising mirror 11 toward the collimating lens 12.

The laser beams which are guided to the collimating lens 12 in the above manners are converted to a parallel beam and guided to the objective lens 13 through which the first laser beam is focused as an optical spot on the recording surface of a DVD which is an optical recording medium and through which the second laser beam is focused as an optical spot on the recording surface of a CD or a CD-R which is an optical recording medium.

Therefore, the information can be recorded on the optical recording medium, DVD or CD-R.

For reproducing the information from the optical recording medium, DVD or CD, the returning beam of the laser light which has been reflected on the optical recording medium passes through the objective lens 13, the collimating lens 12, and the raising mirror 11, and then returns to the prism 6 again. The optical axis of the portion of the returning beam is bent on the partial reflective surface at a right angle and the beam is returned to the half mirror 7. Then, the portion of the returning beam passes through the partial reflective surface of the half mirror 7 to be incident on the focus-error-detecting lens 17 through which the beam reaches the photo detector 9. The focus-error-detecting lens 17 produces astigmatism of both of the returning beams of the laser light to detect focus-errors. Therefore, the returning beam of the laser light, which is to be detected by the photo detector 9, is given astigmatism by passing through the focus-error-detecting lens 17. For this reason, a four-split photo detector is used for the photo detector 9 so that focusing correction is performed through the photoelectric flow rate of the four-split photo detector.

Figure 2A:
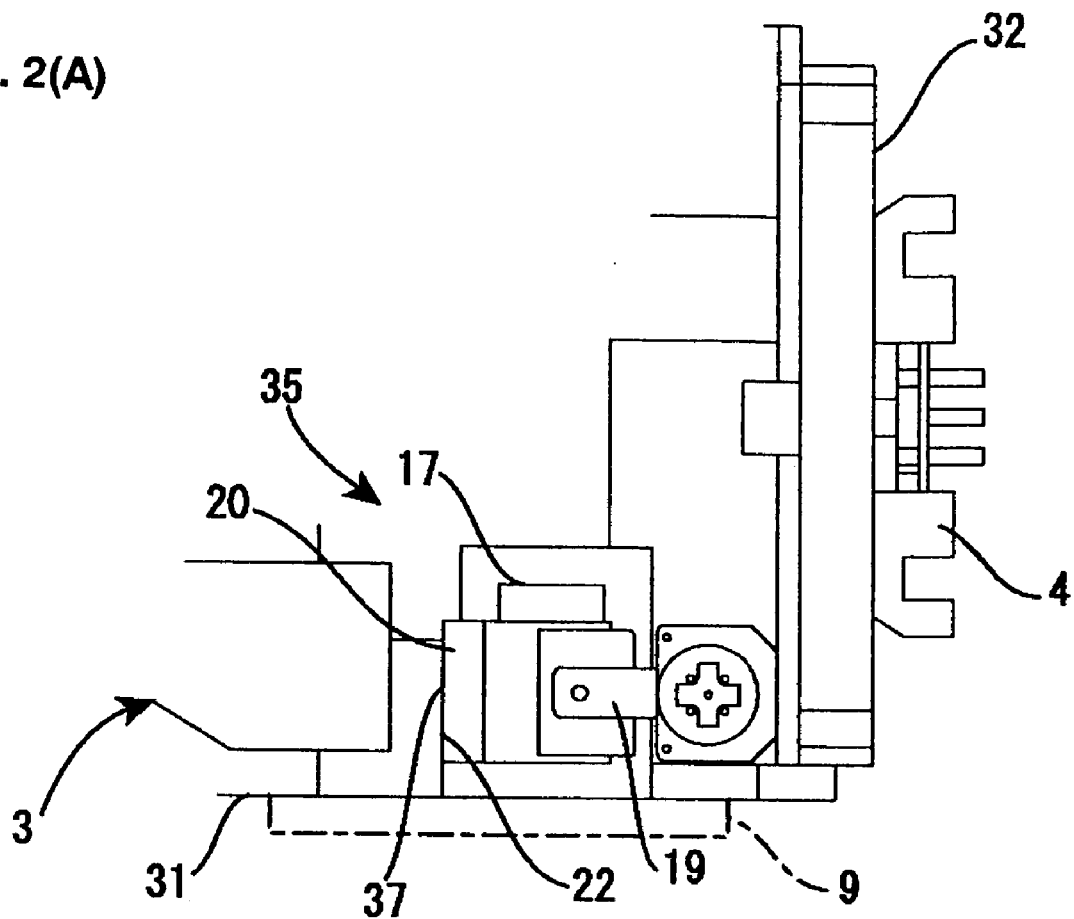
FIG. 2(A) and FIG. 2(B) respectively show a bottom view of the optical head device of FIG. 1 showing how a lens holder for the focus-error-detecting lens and other elements are mounted on the base, and a side view of (A) observed from the side of the photo detector.
Figure 2B:
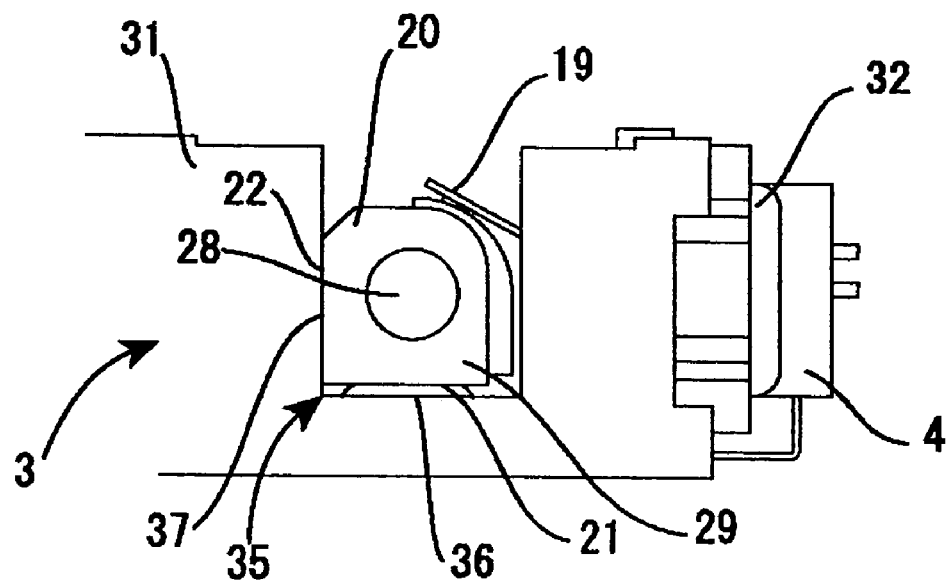
Figure 3A:
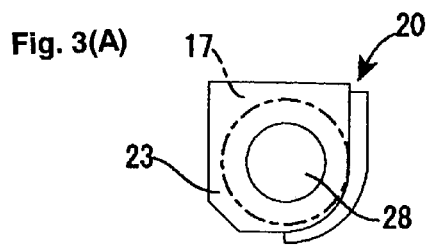
FIG. 3(A) through (G) respectively show a back view, a plan view, a front view, a bottom view, a left side view, a right side view and a perspective view of the lens holder shown in FIG. 2.
Figure 3B:
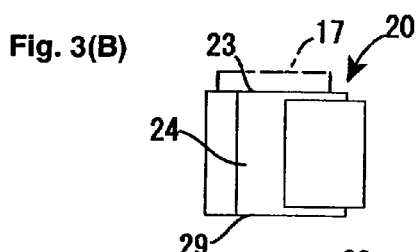
Figure 3E:
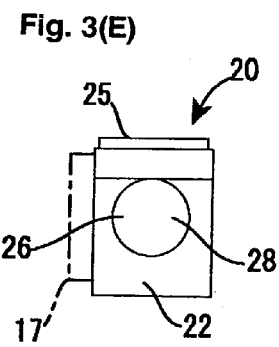
Figure 3C:
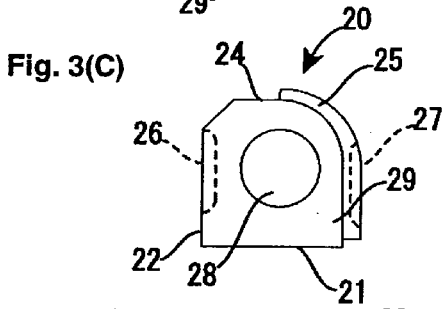
Figure 3D:
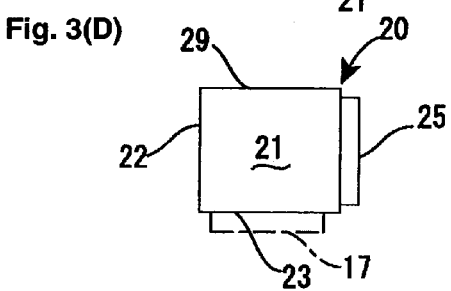
Figure 3G:
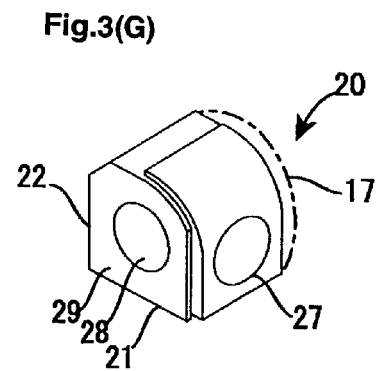
Figure 3F:
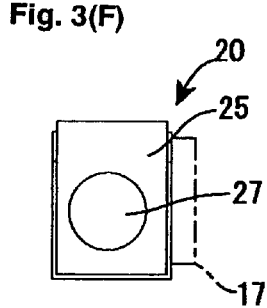

FIGS. 2(A) and (B) respectively show a bottom view of the optical head device of FIG. 1 showing that a lens holder holding the focus-error-detecting lens and other elements are mounted on the base, and a side view of FIG. 2(A) observed from the side of the photo detector. FIGS. 3(A) through (G) respectively show a back view, a plan view, a front view, a bottom view, a left side view, a right side view and a perspective view of the lens holder shown in FIG. 2.

In the optical head device 1 of this embodiment, the above optical system is mounted on an aluminum base. FIGS. 2(A) and (B) show the portion of the base on which the photo detector 9, the first photo diode 4, and the focus-error-detecting lens 17 are mounted.

In FIGS. 2(A) and (B), the photo detector 9, which is the first optical element, is fixed by an adhesive directly to a side edge 31 of the base 3; the side edge 31 of the base 3 and the device optical axis of the photo detector 9 are orthogonal to each other. On the front side of the photo detector 9 on the base 3, the focus-error-detecting lens 17, which is the second optical element, is mounted; and the first photo diode 4, which is the first optical element, is fixed with adhesive directly to another side edge 32 of the base 3.

In this embodiment, in order to mount the focus-error-detecting lens 17 on the base 3, a focus-error-detecting lens mounting portion 35 having a first positioning surface 36 and a second positioning surface 37 is formed such that the surface 36 and 37 are parallel to the optical axes of the photo detector 9 and the focus-error-detecting lens 17, and the first and second positioning surfaces 36, 37 are orthogonal to each other.

The focus-error-detecting lens 17 is mounted onto the focus-error-detecting lens mounting portion 35 under the condition where it is surface-bonded to the cylindrical lens holder 20. For the lens holder 20 (optical element holder) a PPS resin is used which is prepared to have substantially the same linear expansion coefficient as that of the aluminum which composes the base 3.

As shown in FIGS. 2(A) and (B) and FIGS. 3(A) through (G), the lens holder 20 has a first fixing surface 21, which is the bottom surface, a second fixing surface 22, which is the side surface orthogonal to the first fixing surface 21, and a lens fixing surface 23 which is orthogonal to both the first fixing surface 21 and the second fixing surface 22. The first fixing surface 21 is fixed with adhesive to the first positioning surface 36 of the focus-error-detecting lens mounting portion 35. The second fixing surface 22 is fixed with adhesive to the second positioning surface 37 of the focus-error-detecting lens mounting portion 35. Also, the focus-error-detecting lens 17 is surface-bonded to the lens fixing surface 23 of the lens holder 20, which is perpendicular to the device optical axis of the lens holder 20. The other side of the lens holder 20 from the lens fixing surface 23 is a test reference surface 29 which is used to measure the positional relationship between the focus-error-detecting lens 17 and the lens holder 20 when the lens 17 is attached to the lens holder 20. Note that a through hole 28 opens at the lens fixing surface 23 and at the test reference surface 29 of the lens holder 20.

It is designed that, under the condition where the focus-error-detecting lens 17 is fixed with adhesive to the lens fixing surface 23 of the lens holder 20, the length of the perpendiculars from the optical axis (the center of the opening) of the focus-error-detecting lens 17 to the first fixing surface 21 is equal to that from the optical axis (the center of the opening) of the focus-error-detecting lens 17 to the second fixing surface 22.

The portion of the lens holder 20 from the top surface 24 to the side surface opposite from the second fixing surface 22 is formed as a curved surface 25, to which a front end portion of a flat spring 19 which is screwed with its base portion into the base 3 is in contact with the upper incline. Therefore, while the lens holder 20 is temporarily fixed to the focus-error-detecting lens mounting portion 35 with the flat spring 19, the lens holder 20 is pressed down into the intersection of the first fixing surface 21 and the second fixing surface 22. Consequently the first fixing surface 21 of the lens holder 20 is pressed with resilience toward the first positioning surface 36 of the focus-error-detecting lens mounting portion 35 and the second fixing surface 22 is pressed with resilience toward the second positioning surface 37.

In the lens holder 20, a circular recess portion 26 is formed in the second fixing surface 22; when the recess portion 26 is molded, an eject pin comes in contact with the inner side of the recess portion 26. Also, another circular recess portion 27 is formed in the curved surface 25; when the recess portion 27 is molded, the inner side of the recess portion 27 is to be positioned at a gate. For these reasons, when the lens holder 20 is molded of resin, the scars from the eject pin or the gate remain in the bottom portions of the recess portions 26 and 27, and the scars do not appear on the outside. Consequently a secondary process to remove the scars which may appear on the outside does not need to be performed.

The fabrication process of the optical head device 1 having such a configuration has a step for mounting the focus-error-detecting lens 17 onto the base 3, wherein the photo detector 9 is first surface-bonded to the base 3, and the lens holder 20 holding the focus-error-detecting lens 17 is placed at the focus-error-detecting lens mounting portion 35 and then temporarily fixed with the flat spring 19. Therefore, the first fixing surface 21 of the lens holder 20 is positioned while pressed with resilience toward the first positioning surface 36 of the focus-error-detecting lens mounting portion 35; the second fixing surface 22 is positioned while pressed with resilience toward the second positioning surface 37. Consequently the optical axis of the photo detector 9 and that of the focus-error-detecting lens 17 align with each other.

Next, the first laser diode 4 or the second laser diode 5 is lightened; while the laser beam (emitted by the diode 4 or 5) is being monitored by the photo detector, the lens holder 20 is moved in the optical axis direction to adjust the position of the focus-error-detecting lens 17 in the optical axis direction; then, the first fixing surface 21 and the second fixing surface 22 of the lens holder 20 are respectively fixed with adhesive to the first positioning surface 36 and the second positioning surface 37 on the base 3.

As described above, since the focus-error-detecting lens 17 is mounted onto the base through the lens holder 20 in this embodiment, the position of the focus-error-detecting lens 17 can be adjusted by adjusting the position of the lens holder 20.

Also, the two positioning surfaces 36 and 37, which are orthogonal to the focus-error-detecting lens mounting portion 35 of the base 3, are parallel to the optical axes of the photo detector 9 and focus-error-detecting lens 17 in this embodiment; the two fixing surfaces 21 and 22 of the lens holder 20 are made to have contact respectively with the two positioning surfaces 36 and 37 of the lens mounting portion 35. For this reason, the optical axis of the photo detector 9 and that of the focus-error-detecting lens 17 align with each other only by positioning the lens holder 20 at the focus-error-detecting lens mounting portion 35. Further, as the lens holder 20 is moved in the optical axis direction, the position of the focus-error-detecting lens 17 in the optical axis direction can be adjusted.

In addition, the lens holder 20 is composed of a material having the same linear expansion coefficient as that of the base 3, and is directly fixed with adhesive to the base 3. Moreover, the focus-error-detecting lens 17 is fixed to the surface that is perpendicular to the device optical axis of the photo detector 9 and focus-error-detecting lens 17. Therefore, even when the temperature rises due to the heat from the laser diode 4, the displacement of the optical axis may be only ⅓ of that when the focus-error-detecting lens is mounted directly on the base 3.

Further, while the photo detector 9, which is the first optical element, is fixed directly to the base 3, the focus-error-detecting lens 17, which is the second optical element, is mounted on the base 3 via the lens holder 20. The two positioning surfaces 36 and 37 are formed in the focus-error-detecting lens mounting portion 35 to be parallel to the optical axes of the photo detector 9 and the focus-error-detecting lens 17. Also, the lens holder 20 is composed of a material having the same linear expansion coefficient as that of the base. For these reasons, even if the temperature rises in the focus-error-detecting lens mounting portion 35 and the lens holder 20 due to the heat from the laser diode 4, the optical axis of the photo detector, which is directly fixed with adhesive to the base 3, will not be displaced from the optical axis of the focus-error-detecting lens 17, which is mounted on the base 3 via the lens holder 20.

Even with such a configuration, the lens holder 20 is required to have high precision only with respect to the outer circumferential surface on which the first and second fixing surfaces 21 and 22, the lens fixing surface 23, and the test reference surface 29 are formed.

The above embodiment has used the configuration in which the first positioning surface 36 and the second positioning surface 37 on the base 3 are orthogonal to each other and the first fixing surface 21 and the second fixing surface 22 of the lens holder 20 are orthogonal to each other. However, the angle is not limited to a right angle as long as the first and second positioning surfaces 36 and 37 make an angle equal to that of the first and second mounting surfaces 21 and 22.

Although the present invention is applied to the mounting of the focus-error-detecting lens 17 in the above embodiment, it may be applied to the mounting of other optical elements on the base 3.

As described above, since the optical element is mounted on the base via the optical element holder in the present invention, the position of the optical element can be adjusted by adjusting the position of the optical element holder. Also, the element holder is composed of a material having the same linear expansion coefficient as that of the base, and is in direct contact with the base. Moreover, the optical element is fixed to the surface of the element holder which is perpendicular to the (device) optical axis of the element holder. Therefore, even when the temperature rises, the displacement of the optical axis may be only ⅓ (one third) of that produced when the optical element is directly mounted on the base.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

What is claimed is:

1. An optical head device comprising:
a laser light source;
a photo detector;
an optical system which converges the laser beam emitted by said laser light source onto an optical recording medium and guides the returning beam from said optical recording medium to said photo detector; and
a base on which said optical system, said laser light source and said photo detector are mounted;
wherein said photo detector is mounted directly on a face of said base which is orthogonal to an optical axis of the photo detector;
wherein said optical system has an optical element which is mounted on said base via an optical element holder;
wherein two positioning surfaces are formed on a mounting portion of said base for said optical element such that said two positioning surfaces are parallel to the optical axis of the photo detector and an optical axis of said optical element and intersect with each other, said optical element holder being equipped with two mounting surfaces which respectively contact with said two positioning surfaces;
wherein said optical element holder is made of material composed of a material having the same linear expansion coefficient as that of said base and is fixed with adhesive directly to said base; and said optical element is fixed on a surface, wherein the surface is positioned on an orthogonal plane to the optical axis;
wherein the optical element is surface bonded with an adhesive on a surface of the optical element holder which is orthogonal to the optical axis; and
wherein the optical element holder is positioned by abutting the two mounting surfaces with the two positioning surfaces of said base so that the optical axis of the photo detector and the optical axis of said optical element are maintained in an aligned state.

2. The optical head device as set forth in claim 1, wherein said two positioning surfaces are orthogonal to each other.

3. The optical head device as set forth in claim 2, wherein the two mounting surfaces and the orthogonal plane of the optical element holder are orthogonal to each other.

4. The optical head device as set forth in claim 3, wherein said optical element is a focus-error detecting lens through which the laser beam reaches the photo detector.

5. The optical head device as set forth in claim 3, wherein the base is an aluminum base and the optical element holder is a PPS resin which is prepared to have substantially the same linear expansion coefficient as that of said aluminum base.

* * * * *